United States Patent [19]

Newman et al.

[11] Patent Number: 4,880,554

[45] Date of Patent: Nov. 14, 1989

[54] THERMOPLASTIC BLEND OF POLYCARBONATE, POLYMETHYLMETHACRYLATE AND AES

[75] Inventors: Thomas H. Newman; David E. Henton; Silvia A. Evans, all of Midland, Mich.

[73] Assignee: The Dow Chemical Company, Midland, Mich.

[21] Appl. No.: 234,713

[22] Filed: Aug. 22, 1988

[51] Int. Cl.$^4$ ............................................. C08L 69/00
[52] U.S. Cl. ...................................... 525/67; 525/69; 525/148
[58] Field of Search .................... 525/67, 148, 146, 69

[56] References Cited

U.S. PATENT DOCUMENTS

| | | | |
|---|---|---|---|
| 3,130,177 | 4/1964 | Grabowski | 260/45.5 |
| 4,390,657 | 6/1983 | Liu | 525/504 |
| 4,419,491 | 12/1983 | Sakano et al. | 525/67 |
| 4,515,921 | 5/1985 | Witman | 525/67 |
| 4,544,706 | 10/1985 | Finch et al. | 525/146 |
| 4,579,903 | 4/1986 | Liu et al. | 524/508 |
| 4,579,909 | 4/1986 | Giles, Jr. et al. | 525/67 X |
| 4,628,074 | 12/1986 | Boutni | 525/146 |
| 4,704,432 | 11/1987 | Feay | 525/133 |

FOREIGN PATENT DOCUMENTS 1182807  3/1970  United Kingdom .
1543146  3/1979  United Kingdom .

Primary Examiner—Theodore E. Pertilla
Attorney, Agent, or Firm—Harness, Dickey & Pierce

[57] ABSTRACT

A new polymeric composition of matter comprises an intimate blend of an aromatic polycarbonate, polymethylmethacrylate (PMMA), and a terpolymer of ethylene propylene-diene (EPDM) rubber-toughened styrene-acrylonitrile (SAN). The blend of the present invention has improved physical properties and excellent environmental stress crack resistance toward organic solvents.

7 Claims, No Drawings

THERMOPLASTIC BLEND OF POLYCARBONATE, POLYMETHYLMETHACRYLATE AND AES

BACKGROUND OF THE INVENTION

The present invention relates generally to weatherable thermoplastic blends. more specifically, the present invention relates to a novel thermoplastic blend of polycarbonate, polymethylmethacrylate and AES resins with improved environmental stress crack resistance.

Aromatic polycarbonate polymers are well known commercially available materials having a variety of applications in the plastics art. Generally speaking, aromatic polycarbonate resins offer a high resistance to attack by mineral acids, have high tensile strength and high impact strength except in thick sections, good thermal resistance and a dimensional stability far surpassing that of most other thermoplastic materials.

In certain applications the use of aromatic polycarbonates is, however, severely limited due to their relatively poor environmental stress crack resistance to organic solvents such as, for example, gasoline, acetone, heptane, and carbon tetrachloride. Contact with such solvents may occur, for example, when polycarbonates are used in automobiles or when solvents are used to clean or degrease stressed parts made from such resins. The most significant effect of this poor solvent resistance is a loss in vital impact strength and also an increase in brittle type failure of parts which have been exposed to these organic solvents.

Attempts to develop tough, weatherable thermoplastics have resulted in blends of polycarbonate and acrylonitrile-butadiene-styrene (ABS)-type resins, see U.S. Pat. No. 3,130,177; blends of polycarbonate, ABS and multiphase composite acrylic interpolymers, see, U.S. Pat. No. 4,390,657; and blends of polycarbonate, acrylate-styrene-acrylonitrile (ASA) and polymethylmethacrylate (PMMA) resins, see U.S. Pat. No. 4,579,909. However, these blends are not totally satisfactory in general because of either a lack of weatherability or poor resistance to solvents. Polycarbonate-ABS blends, in particular, typically exhibit phase separation (i.e. delamination) in molded parts which results in poor directionality bias in physical properties. In addition, these blends are problematic when used in automotive body parts and fittings because of their poor environmental stress crack resistance to organic solvents such as gasoline.

Thus, it would be advantageous to provide a thermoplastic blend which is resistant to wear and weather, with satisfactory lamination characteristics and physical properties. It would further be advantageous if the thermoplastic blend exhibited good environmental stress crack resistance toward organic solvents such as gasoline.

SUMMARY OF THE INVENTION

The present invention generally comprises an intimate blend of polycarbonate, polymethylmethacrylate and an olefin-diene rubber-modified styrene acrylonitrile. A blend of the present invention preferably comprises from about 40% to 80% of an aromatic polycarbonate, from about 5% to 40% polymethylmethacrylate (PMMA), and from about 15% to 50% acrylonitrile-EPDM-styrene (AES). The thermoplastic blend of the present invention exhibits improved physical properties and an unexpected increase in environmental stress crack resistance toward organic solvents such as gasoline.

DETAILED DESCRIPTION OF THE INVENTION

The present invention comprises a thermoplastic blend of a polycarbonate, a polymethylmethacrylate, and an olefin-diene rubber-modified styrene acrylonitrile resin.

Polycarbonate resins suitable for compositions of the present invention include polycarbonates of a relatively high molecular weight. Preferred polycarbonate resins are aromatic polycarbonates of a weight average molecular weight in the range of from about 14,000 to about 50,000. More preferred is a polycarbonate of the general structure

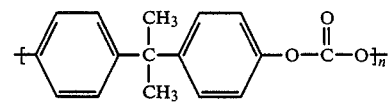

having a molecular weight of from about 20,000 to about 35,000.

Polymethylmethacrylate resins suitable for compositions of the present invention include polymethylmethacryalte (PMMA), co-/terpolymers of methylmethacrylate with other vinyl monomers, and rubber-modified polymethylmethacrylate resins. Rubber-modified PMMA resins modified by saturated elastomers are preferred. PMMA polymers having about 30% grafted polybutyl acrylate rubber dispersed in the matrix are most preferred.

Olefin-diene rubbers suitable for modifying styrene-acrylonitrile (SAN) resins in compositions of the present invention include those olefin elastomers prepared by Ziegler-Natta polymerization. Particularly useful are the ethylene-propylene-diene rubber (EPDM) terpolymers, such as, for example, ethylene propylene norbornene, ethylene propylene ethylidene norbornene, ethylene propylene butadiene, ethylene propylene pentadiene, ethylene propylene hexadiene, ethylene propylene cyclopentadiene, and the like. These EPDM type terpolymers are well known in the art and are generally commercially available. Most preferred is ethylene propylene ethylidene norbornene.

The components of the subject compositions can be blended by any technique which effects intimate intermixing of components without significant mechanical or thermal degradation of the polymer components. For example, the components can be dissolved or dispersed in a compatible diluent, blended together to produce a homogenous dispersion or solution and the diluent removed.

One particularly convenient method for preparing the blends of the present invention is to dry blend particulates or powders of each respective component. This dry blend is directly fed into a heat fabricating apparatus such as a screw extruder or a reciprocating screw injection molding machine with sufficient mixing. While the particular manner of mixing these components in heat plasticized form is not critical, sufficient mixing should be employed to ensure a uniform distribution of each of the components throughout the resulted blend. In addition to the foregoing mixing procedures, other conventional mixing procedures may be employed including hot roll milling, kneading and the like. The preferred method of blending the polymer components of the present invention is in an extruder at a temperature and shear rate which will effect intimate mixing without significant polymer degradation.

Any of various types of extrusion devices capable of bringing polymeric components into the melted state and providing a continuous or intermittent flow of the composition through the die may be employed to prepare a composition of the invention. Such devices can include the single screw, double screw, or multiple screw extruders having a planetary screw and/or a plate for transformation of the mixtures into finished or semifinished products.

A preferred composition of the present invention comprises a blend of polycarbonate of the general structure

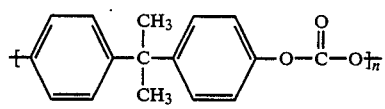

having a molecular weight of about 31,000 available commercially from Dow Chemical Company under the trade name Calibre ® XP73010.00, blended with a rubber-modified PMMA resin having 30% grafted acrylate rubber available commercially by Rohm and Haas Company under the trade name Plexiglas DR100, and a terpolymer comprising EPDM rubber-toughened styrene-acrylonitrile (AES) commercially available from Dow Chemical Company under the trade name Rovel ® 401.

Suitable amounts of the preferred components in a blend of the invention include from about 40% to about 80% of Calibre ® XP73010.00 polycarbonate, from about 5% to 40% Plexiglas DR100, and from about 15% to about 50% Rovel ® 401. Preferably, the components of the preferred composition are present in amounts of from about 50% to about 70% Calibre ® XP73010.00, from about 10% to about 20% Plexiglas DR100, and from about 20% to about 40% Rovel ® 401.

Compositions of the present invention exhibit greater stiffness than polycarbonate or polycarbonate-ABS blends as indicated by a higher tensile modulus and show a dramatic increase in environmental stress crack resistance to organic solvents, gasoline in particular. Such improved solvent resistance is documented by the experimental data summarized below.

EXPERIMENTAL DATA

TABLE 1

COMPOSITIONS

|  | Composition A | Composition B | Composition of the Invention |
|---|---|---|---|
| Calibre ® XP7301.00 Polycarbonate | 100% | 50% | 50% |
| Plexiglas DR100 (rubber-modified PMMA) | 0% | 0% | 15% |
| Rovel ® 401 (AES: EPDM rubber-toughened SAN) | 0% | 50% | 35% |

Composition B, the polycarbonate/AES blend and the composition of the invention were obtained by extruding dry mixed pellets of the individual components of the compositions using a twin-screw extruder. The resulting pellets of the blends were compression molded.

Compositions A, B and the composition of the invention were compression-molded into ⅛ inch by ½ inch by 6 inch bars. A set of 5 bars of each composition were immersed in a mixture of 75% isooctane and 25% toluene by volume while a constant stress was applied. The fracture time of each bar was measured in seconds and averaged to obtain the data in Table 2 below.

As shown by the data summarized in Table 2 below, the composition of the present invention showed a dramatic increase in environmental stress crack resistance over compositions A and B.

TABLE 2

FRACTURE TIME (SECONDS)

| Stress | Composition A | Composition B | Composition of the Invention |
|---|---|---|---|
| 2500 psi | 450 | 3,000 | 150,000 |
| 2000 psi | 2,500 | 18,000 | 310,000 |
| 1500 psi | 10,000 | 310,000 | no break |

It should be appreciated that a latitude of modification, change and substitution is intended in the foregoing disclosure and, accordingly, it is appropriate that the appended claims be construed broadly and in a manner consistent with the spirit and the scope of the invention herein.

What is claimed is:

1. The thermoplastic blend comprising:
   from about 40% to about 80% polycarbonate;
   from about 5% to about 40% of rubber-modified polymethylmethacrylate; and
   from about 15% to about 50% of the olefin-diene rubber-modified styrene-acrylonitrile resin.

2. The blend of claim 1, wherein the olefin-diene rubber resin comprises an ethylene-propylene-diene terpolymer elastomer.

3. The blend of claim 2, wherein the polycarbonate is an aromatic polycarbonate of a molecular weight in the range of from about 14,000 to about 50,000.

4. The blend of claim 3, wherein the polycarbonate is of the general structure

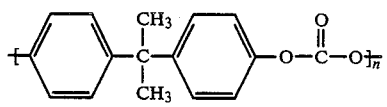

having a weight average molecular weight of from about 20,000 to about 35,000.

5. A thermoplastic blend comprising:
   an aromatic polycarbonate resin of a molecular weight in the range of from about 14,000 to about 50,000;
   a rubber-modified polymethylmethacrylate resin comprising from about 15% to about 40% of grafted acrylate rubber; and
   EPDM rubber-modified styrene-acrylonitrile.

6. The blend of claim 5, wherein the polycarbonate resin has a molecular weight in the range of from about 20,000 to about 35,000.

7. The blend of claim 6, comprising:
   in the range of from about 50% to about 70% polycarbonate;
   in the range of from about 10% to about 20% rubber-modified polymethylmethacrylate; and
   in the range of from about 20% to about 40% EPDM-rubber-modified styrene-acrylonitrile.

* * * * *